(12) United States Patent
Ayyapureddi

(10) Patent No.: US 11,271,735 B1
(45) Date of Patent: Mar. 8, 2022

(54) APPARATUSES, SYSTEMS, AND METHODS FOR UPDATING HASH KEYS IN A MEMORY

(71) Applicant: MICRON TECHNOLOGY, INC., Boise, ID (US)

(72) Inventor: Sujeet Ayyapureddi, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 34 days.

(21) Appl. No.: 17/003,687

(22) Filed: Aug. 26, 2020

(51) Int. Cl.
*H04L 9/08* (2006.01)
*G06F 3/06* (2006.01)
*G06F 11/10* (2006.01)
*G06F 7/58* (2006.01)

(52) U.S. Cl.
CPC .......... *H04L 9/0891* (2013.01); *G06F 3/0623* (2013.01); *G06F 3/0659* (2013.01); *G06F 3/0673* (2013.01); *G06F 11/1068* (2013.01); *H04L 9/0869* (2013.01); *G06F 7/588* (2013.01)

(58) Field of Classification Search
CPC ... H04L 9/0891; H04L 9/0869; G06F 3/0623; G06F 3/0659; G06F 3/0673; G06F 11/1068; G06F 7/588
See application file for complete search history.

(56) References Cited

U.S. PATENT DOCUMENTS

| | | | | |
|---|---|---|---|---|
| 8,458,453 | B1 * | 6/2013 | Mahalingaiah | H04L 12/462 |
| | | | | 713/153 |
| 8,683,572 | B1 * | 3/2014 | Mahalingaiah | H04L 63/126 |
| | | | | 726/10 |
| 9,231,926 | B2 * | 1/2016 | Adkins | H04L 9/0866 |
| 2006/0269063 | A1 * | 11/2006 | Hauge | H04N 21/23895 |
| | | | | 380/262 |
| 2013/0204912 | A1 * | 8/2013 | Kawachiya | G06F 9/4488 |
| | | | | 707/813 |
| 2018/0183601 | A1 * | 6/2018 | Campagna | H04L 63/1441 |
| 2021/0342491 | A1 * | 11/2021 | Vetteth | H04L 61/6022 |

\* cited by examiner

*Primary Examiner* — Kyle Vallecillo
(74) *Attorney, Agent, or Firm* — Dorsey & Whitney LLP

(57) ABSTRACT

Apparatuses, systems, and methods for updating hash values in a memory. A memory device may include one or more hash circuits, each of which may generate a hash value based on an input, such as a row address, and a set of hash keys. To increase the unpredictability of operations in the memory, the hash keys may be changed responsive to one or more triggers. Example triggers may include, a power up/reset operation, a command issued to the memory, or internal logic of the memory (e.g., a timer). Responsive to one or more of these triggers, the hash keys may be regenerated. For example a new seed value may be generated and used by a random number generator to generate the new set of hash keys.

22 Claims, 5 Drawing Sheets

APPARATUSES, SYSTEMS, AND METHODS FOR UPDATING HASH KEYS IN A MEMORY

BACKGROUND

This disclosure relates generally to semiconductor devices, such as semiconductor memory devices. The semiconductor memory device may include a number of memory cells which are used to store information. The stored information may be encoded as binary data, and each memory cell may store a single bit of the information.

A memory device may be used to store various pieces of information which are sensitive. Malicious actors may attempt to operate the memory in a manner which allows them illicit access to one or more pieces of sensitive data, and/or which allows them to corrupt the information stored in the memory. It may be useful to increase the unpredictability of certain memory operations in order to reduce the ease with which memory operations can be anticipated/tampered with.

DETAILED DESCRIPTION

Figure 1:
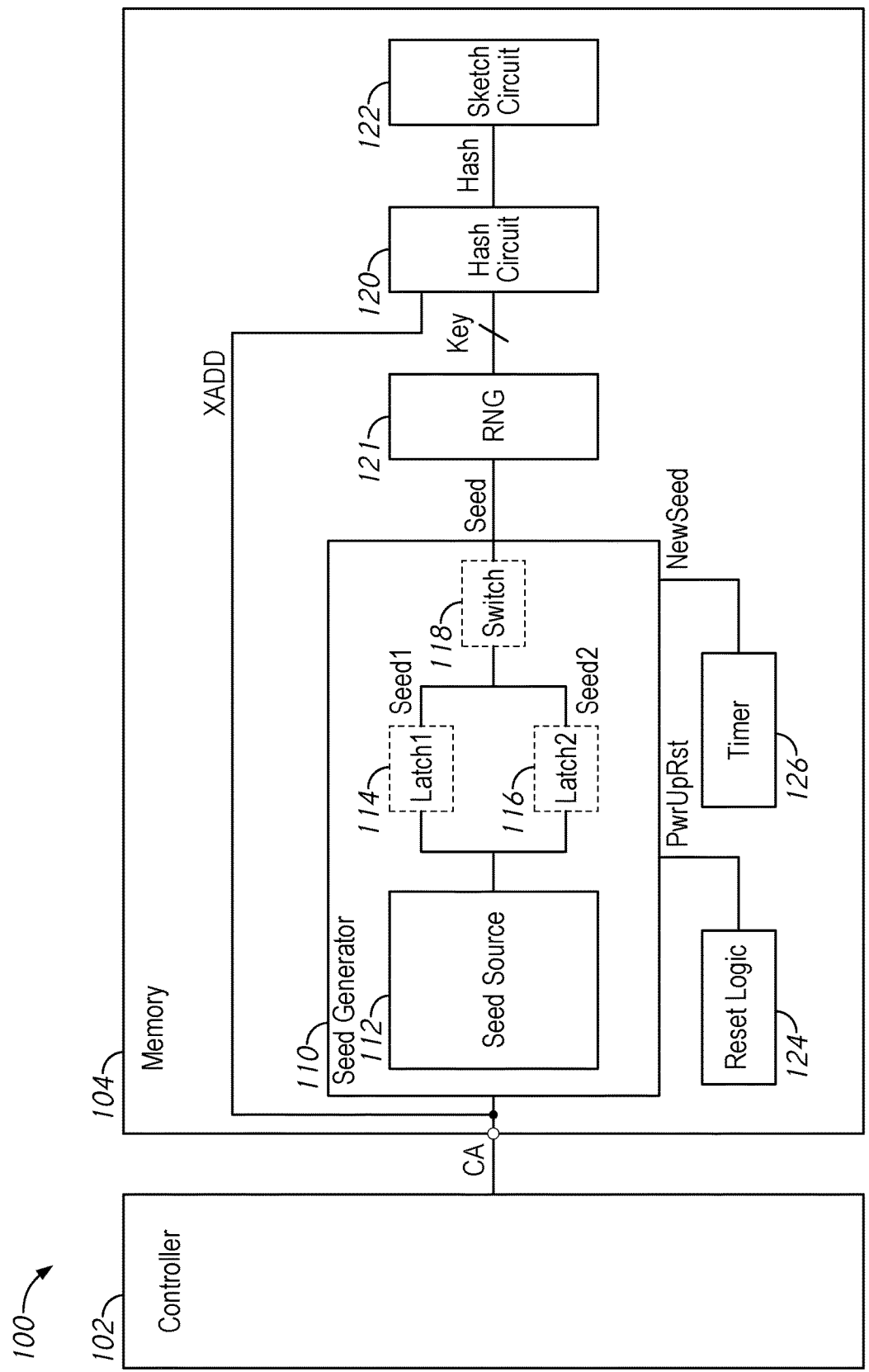
FIG. 1 is a block diagram of a memory system according to some embodiments of the present disclosure.

The following description of certain embodiments is merely exemplary in nature and is in no way intended to limit the scope of the disclosure or its applications or uses. In the following detailed description of embodiments of the present systems and methods, reference is made to the accompanying drawings which form a part hereof, and which are shown by way of illustration specific embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

A memory device may include a memory array which has a number of memory cells, each located at the intersection of a word line (row) and digit line (column). During a read or write operation, a row may be activated, and data may be read from, or written to, the memory cells along the activated row. The memory may perform various operations to maintain the information in the memory cells. For example, information in the memory cells may decay over time and the memory may need to periodically refresh the information. In addition, certain access patterns, such as frequent accesses to a given 'aggressor' row (a row hammer) may cause an increased rate of decay in other nearby 'victim' rows. The memory may track accesses to one or more rows with a refresh control circuit in order to locate and refresh these victim rows. To reduce the number of tracked access counts, the memory may use a hash circuit to compress the row address (e.g., from an N-bit row address to an M-bit hash value). However, if the row hammer attack is caused by a malicious actor, they may use knowledge of how the refresh control circuit operates to circumvent the memories protections. Accordingly, for this and other example operations, it may be useful to reduce the predictability of the operation of such circuits.

The present disclosure is directed to apparatuses, systems, and methods for updating hash keys in a memory. The memory may use a hash value for various operations in the memory (e.g., tracking various row addresses). The hash value may be generated by a hash circuit based on an input value (e.g., a row address) and a set of keys. The memory may change the keys as a way of introducing unpredictability (e.g., randomness, non-deterministic behavior, etc.) into various operations. The keys may be a set of binary numbers based on a seed value. The memory may use a random number generator to generate the seed value, and may use various triggers to generate a new seed value. For example, the memory may receive a command from a controller which instructs the memory to regenerate the seed value, may regenerate the seed value as part of a power up/reset operation, may periodically regenerate the seed value, or combinations thereof. This may increase the unpredictability of the memory since it may be extremely difficult to predict what the seed value will be at any given time. Further, the different triggers used to regenerate the seed value may be relatively difficult for an outside actor to predict.

In some embodiments, the memory may use one or more hash values as part of a sketch circuit. The sketch circuit may include multiple sets of count values, each of which is indexed by a hash value from a different hash circuit. The sketch circuit may be used to count a number of times (and/or a frequency) at which certain values along an input stream appear. In some example applications, it may be useful to count a number or rate of times certain row addresses of the memory appear. The row address may be received by the hash circuits of the sketch circuit, and may be hashed into different hash values. A first hash value may be used as an index for the first set of count values, a second hash value may be used as an index for the second set of count values, etc. The indexed count values may be changed (e.g., incremented). In this manner each count value may be associated with a different set of row addresses. The value(s) of the group of count values indexed when a row address is received (e.g., a minimum of the group of count values) may be used to determine the number of times and/or frequency at which that row address has been received by the sketch circuit. This may be useful, for example when determining where to perform targeted refresh operations, or when tracking row addresses associated with errors. Other example applications for hash circuits than sketch circuits, and/or other uses for sketch circuits may be used in other example embodiments.

FIG. 1 is a block diagram of a memory system according to some embodiments of the present disclosure. The system 100 includes a controller 102 and memory 104. The controller 102 may operate the memory 104 by providing various signals to terminals of the memory along corresponding buses coupling the controller 102 to the memory 104. A command/address (CA) bus may carry commands (e.g., read commands, write commands) along with one or more addresses (e.g., row addresses, column addresses, bank addresses) which specify which memory cells the command should be executed on. The controller 102 and memory 104 may be coupled by a variety of other buses not shown in FIG. 1, such as a data bus (DQ), clock bus (CK), and various voltage buses.

The memory includes a seed generator 110 and a hash circuit 120. The seed generator 110 provides a seed value Seed and the hash circuit 120 provides a hash value Hash based, in part, on an input value (e.g., the row address XADD) and a set of keys Key. The set of keys may be based on a seed value Seed, and accordingly the output hash value Hash may be based on the seed value Seed. The hash value Hash may be used by various circuits of the memory 104. In the example of FIG. 1, a sketch circuit (as described in more detail herein) may be used to track various functions of the memory, for example by tracking a number of times particular values of the row addresses XADD appear. The hash value Hash may control the behavior of the sketch circuit 122. Accordingly, changing the value of Seed may in turn alter the operation of the sketch circuit 122, which may make it difficult to predict the operation of the sketch circuit 122.

The seed generator 110 may change the value of the seed value Seed based on one or more triggers which may act as a seed update signal. Since the hash value Hash is based on the seed value, changing the seed value Seed may also change the hash value Hash. In some embodiments, the triggers may be chosen such that they are events which are not part of a required operation of the memory 104 (e.g., things which are not required by the spec of the memory device). Accordingly, it may be hard to, for example, determine when the value Seed will change or how many times it has changed.

The seed generator 110 may include a seed source 112 which may be used to generate the seed value. The seed value Seed may be a binary number, which may have a value based on the seed source 112. Various methods may be used by the seed source 112 to generate the value Seed. For example, in some embodiments, the seed source 112 may capture a value of the memory 104. The seed source 112 may be a latch which is triggered by the seed update signal to capture all or part of a current row address XADD along the row address bus. In some embodiments, the seed source 112 may use a random number generator which may randomly generate the value Seed. For example, the seed source may include a sequence generator, such as a linear feedback shift register (LFSR) which provides values from a relatively long sequence of values. In some embodiments, the seed source 112 may take one or more physical signals of the memory (e.g., voltage) into account to help generate the random number used as the Seed (e.g., by using them as a seed for the sequence generator).

Various signals of the memory 104 may be used to trigger the seed generator 110 to provide a new value of the seed value Seed. For example, signals such as a command signal along the CA bus from the controller 102, a power up/reset signal PwrUpRst and/or a NewSeed signal based on an amount of time may be used to generate a new value of Seed.

In some embodiments, the memory 104 may include a reset logic circuit 124, which may provide the signal PwrUpRst at an active level responsive to a power up or reset operation of the memory 104. For example after completing a reset operation, the reset logic 124 may provide the signal PwrUpRst at an active level. The seed generator 110 may update the value of Seed responsive to the signal PwrUpRst at an active level.

In some embodiments, the memory 104 may include a timer circuit 126, which may provide a signal NewSeed at an active level based on an elapsed amount of time. For example, the timer circuit 126 may count an amount of time (e.g., a number of clock cycles) that a current value of Seed has been present. If that amount of time exceeds a threshold, the timer logic 126 may provide the signal NewSeed at an active level. This may cause the seed generator 110 to provide a new value of the signal Seed, which in turn may reset the timer logic 126.

In some embodiments, the seed generator 110 may receive a signal from the controller 102 (e.g., along the CA bus) which causes the seed generator 110 to generate a new value of Seed. The controller may use various logic to determine when to send such a command. For example, rather than a timer logic 126 on the memory 104, the controller 102 may generate an update seed signal based on timing and provide the seed update signal along the CA bus.

In some embodiments, the seed value Seed may be provided by the controller 102. For example, the controller 102 may issue a mode register write (MRW) command (e.g., along the CA bus) and provide a new seed value along the with the MRW command. The new seed value may be written to a mode register of the memory 104, and the value stored in the mode register may provide the value Seed to the RNG 121. In such embodiments, the seed source 112 may be located in the controller 102, rather than in the memory 104. The controller 102 may use internal logic (e.g., timing) to determine when to provide a new value of Seed to the memory 104.

In some embodiments the random number generated by the seed source 112 may be used directly as the value Seed and the value Seed may change as soon as the seed source 112 generates a new value.

In some embodiments, the seed generator 110 may have already generate a new value of the Seed, and may switch to an already generated new value of Seed responsive to the seed update signal. For example, the seed generator 110 may include a first latch 114 and a second latch 116. At power up, the RNG 112 may generate a first random number RNG1 and store it in the first latch 114 and a second random number RNG2 and store it in the second latch 116. The seed generator 110 may also include switch logic 118. Initially, the first random number RNG1 may be provided as the signal Seed. Responsive to a seed update signal, the switch 118 may change to providing the signal RNG2 as the value Seed, and may trigger the RNG 112 to generate a new value of a random number which may be stored in the first latch 114. Each subsequent seed update signal may cause the switch logic 118 to swap between the values stored in the two latches 114 and 116 as the value Seed.

The seed value is provided to a random number generator (RNG) 121, which generates a set of keys based on the seed. The set of keys may be a set of individual key values, each of which may be a binary number. The length of each key may be based on the length of the hash value Hash, and the number of keys may be based on the length of the input value (e.g., the row address XADD). For example, if the hash value Hash is M-bits long, and the input value XADD is N-bits long, then the RNG 121 may need to generate N keys which are M-bits long. The values of the set of keys may be based, in part, on the value of Seed. For example, the RNG 112 may be a sequence generator, such as an LFSR, and may pick a first value for Key based on the value of the value Seed and may then select subsequent values of Key for each of the other keys in the set based on some internal logic (e.g., next values in the sequence).

In some embodiments, the RNG 121 may produce a whole set of keys at once (e.g., all N keys) and may store them (e.g., in latches) until the hash circuit 120 is ready to use them. In some embodiments, the RNG 121 may produce each key as the hash circuit 120 requires a new key. For example, the hash circuit 120 and RNG 121 may be coupled to a clock signal which may control when new keys are needed and generated.

In some embodiments, the memory 104 may include multiple hash circuits 120. The different hash circuits 120 may share a set of keys in some embodiments. For example, a set of latches may hold the set of keys and each hash circuit may retrieve the set of keys as needed. The different hash circuits 120 may each receive a different set of keys in some embodiments. For example, each hash circuit 120 may be associated with a respective random number generator. The different random number generators may receive the same value Seed in common.

The hash circuit 120 may generate the hash value Hash based on the keys and the input value (e.g., XADD). The hash value Hash may have a different number of bits than the input value. For example, the input row address XADD may be an N-bit number (e.g., N=17 bits), while the hash value Hash may be an M-bit number, where M is less than N (e.g., M is 4, 8, 12, or other values). This means that each value of Hash may be associated with multiple values of the row address. However, which values of the row address are associated with a given value of Hash may be based on the set of keys (which are in turn based on the seed). Accordingly, changing the seed to regenerate the keys may in turn remap which row address values are associated with any given value of Hash. An example hash circuit is described in more detail in FIG. 4.

Hashes may be used in a variety of ways in a memory 104. One example use of a hash is in a sketch circuit, such as the sketch circuit 122 shown in FIG. 1. A sketch circuit may include a set of count values. The value of the Hash may act as an index and determine which count value gets changed based on the input row address. In this way the counts may reflect a number of times that the associated row address values are used as inputs of the hash circuit 120. An example sketch circuit is described in more detail in FIG. 3.

Figure 2:
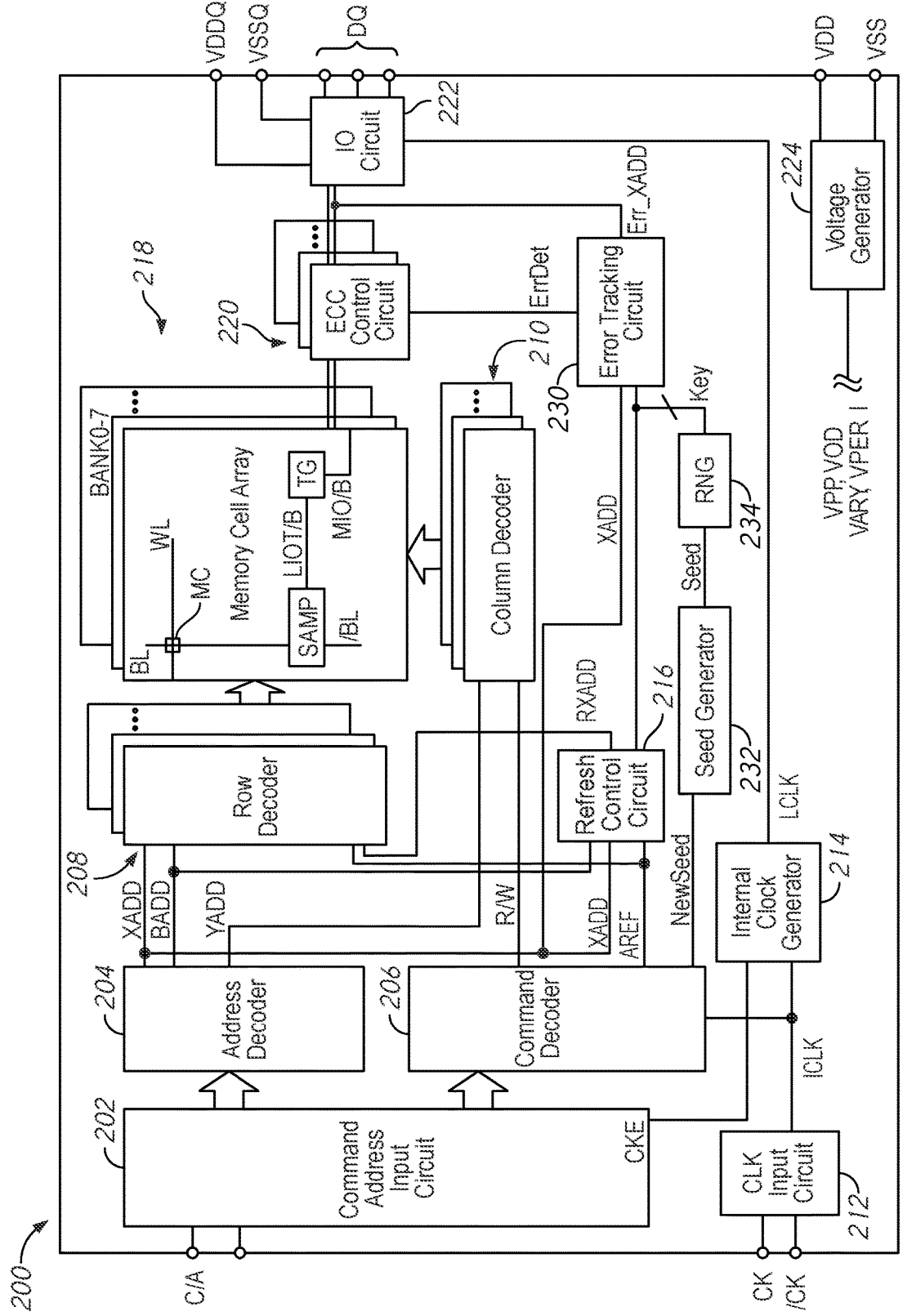
FIG. 2 is a block diagram of a semiconductor device according an embodiment of the disclosure.

FIG. 2 is a block diagram of a semiconductor device according an embodiment of the disclosure. The semiconductor device 200 may be a semiconductor memory device, such as a DRAM device integrated on a single semiconductor chip. The semiconductor device 200 may, in some embodiments, be included in the memory 104 of FIG. 1. The semiconductor device 200 shows a particular example of how hash circuits and keys may be used in an example memory 200.

Figure 3:
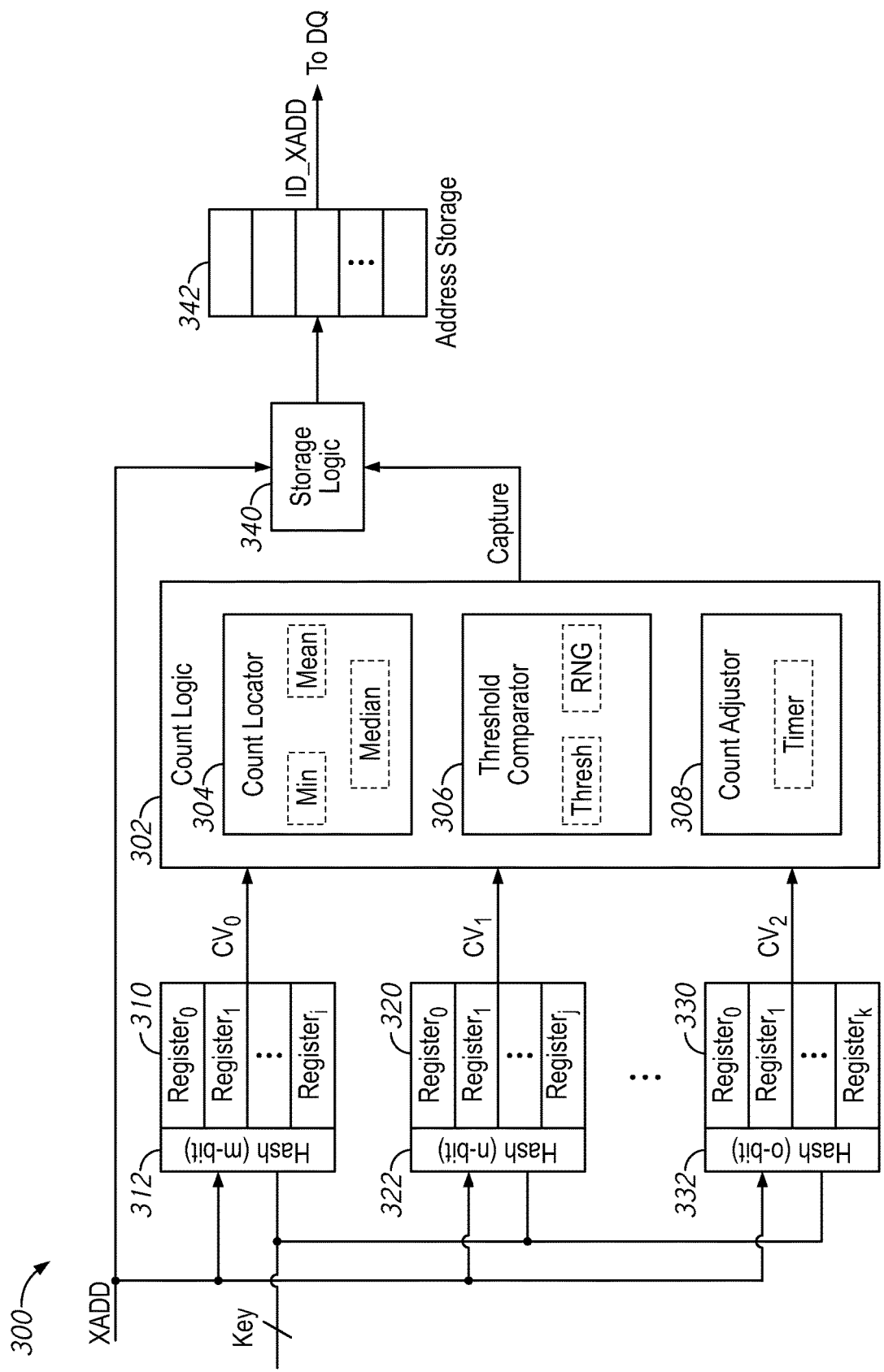
FIG. 3 is a block diagram of a sketch circuit according to some embodiments of the present disclosure.

In particular, the semiconductor device 200 shows hash keys Key being provided to a refresh control circuit 216 and error tracking circuit 230, each of which may include a sketch circuit (described in more detail in FIG. 3). In various embodiments, one or the other, both, or neither of the refresh control circuit 216 and error tracking circuit 230 may use a sketch circuit and receive the signal Key. In some embodiments, other components of the memory may use a sketch circuit. In some embodiments, each sketch circuit may be associated with a different set of keys. In some embodiments, there may be a different sources of the keys (e.g., different seed generators and/or RNG's) for each sketch circuit.

The semiconductor device 200 includes a memory array 218. The memory array 218 is shown as including a plurality of memory banks. In the embodiment of FIG. 1, the memory array 218 is shown as including eight memory banks BANK0-BANK7. More or fewer banks may be included in the memory array 218 of other embodiments. Each memory bank includes a plurality of word lines WL, a plurality of bit lines BL, and a plurality of memory cells MC arranged at intersections of the plurality of word lines WL and the plurality of bit line BL. The selection of the word line WL is performed by a row decoder 208 and the selection of the bit lines BL is performed by a column decoder 210. In the embodiment of FIG. 1, the row decoder 208 includes a respective row decoder for each memory bank and the column decoder 210 includes a respective column decoder for each memory bank. The bit lines BL are coupled to a respective sense amplifier (SAMP). Read data from the bit line BL is amplified by the sense amplifier SAMP, and transferred to read/write amplifiers over complementary local data lines (LIOT/B), transfer gate (TG), and complementary main data lines (MIOT/B) which are coupled to an error correction code (ECC) control circuit 220. Conversely, write data outputted from the ECC control circuit 220 is transferred to the sense amplifier SAMP over the complementary main data lines MIOT/B, the transfer gate TG, and the complementary local data lines LIOT/B, and written in the memory cell MC coupled to the bit line BL.

The semiconductor device 200 may employ a plurality of external terminals that include command and address (C/A) terminals coupled to a command and address bus to receive commands and addresses, and a CS signal, clock terminals to receive clocks CK and /CK, data terminals DQ to provide data, and power supply terminals to receive power supply potentials VDD, VSS, VDDQ, and VSSQ.

The clock terminals are supplied with external clocks CK and /CK that are provided to an input circuit 212. The external clocks may be complementary. The input circuit 212 generates an internal clock ICLK based on the CK and /CK clocks. The ICLK clock is provided to the command decoder 206 and to an internal clock generator 214. The internal clock generator 214 provides various internal clocks LCLK based on the ICLK clock. The LCLK clocks may be used for timing operation of various internal circuits. The internal data clocks LCLK are provided to the input/output circuit 222 to time operation of circuits included in the input/output circuit 222, for example, to data receivers to time the receipt of write data.

The C/A terminals may be supplied with memory addresses. The memory addresses supplied to the C/A terminals are transferred, via a command/address input circuit 202, to an address decoder 204. The address decoder 204 receives the address and supplies a decoded row address XADD to the row decoder 208 and supplies a decoded column address YADD to the column decoder 210. The address decoder 204 may also supply a decoded bank address BADD, which may indicate the bank of the memory array 218 containing the decoded row address XADD and column address YADD. The C/A terminals may be supplied with commands. Examples of commands include timing commands for controlling the timing of various operations, access commands for accessing the memory, such as read commands for performing read operations and write commands for performing write operations, as well as other commands and operations. The access commands may be associated with one or more row address XADD, column address YADD, and bank address BADD to indicate the memory cell(s) to be accessed.

The commands may be provided as internal command signals to a command decoder 206 via the command/address input circuit 202. The command decoder 206 includes circuits to decode the internal command signals to generate various internal signals and commands for performing operations. For example, the command decoder 206 may provide a row command signal to select a word line and a column command signal to select a bit line.

The device 200 may receive an access command which is a read command. When a read command is received, and a bank address, a row address and a column address are timely supplied with the read command, read data is read from memory cells in the memory array 218 corresponding to the row address and column address. The read command is received by the command decoder 206, which provides internal commands so that read data from the memory array 218 is provided to the ECC control circuit 220. The read command may also cause one or more parity bits associated with the read data to be provided along the MIOT/B to the ECC control circuit 220. The ECC control circuit 220 may use the parity bits to determine if the read data includes any errors, and if any errors are detected, may correct them to generate corrected read data. The corrected read data is output to outside the device 200 from the data terminals DQ via the input/output circuit 222. When the ECC control circuit 220 determines that the read data includes an error, it may provide the error detected signal ErrDet at an active level.

The device 200 may receive an access command which is a write command. When the write command is received, and a bank address, a row address and a column address are timely supplied with the write command, and write data is supplied through the DQ terminals to the ECC control circuit 220. The write data supplied to the data terminals DQ is written to a memory cells in the memory array 218 corresponding to the row address and column address. The write command is received by the command decoder 206, which provides internal commands so that the write data is received by data receivers in the input/output circuit 222. Write clocks may also be provided to the external clock terminals for timing the receipt of the write data by the data receivers of the input/output circuit 222. The write data is supplied via the input/output circuit 222 to the ECC control circuit 220. The ECC control circuit 220 may generate a number of parity bits based on the write data, and the write data and the parity bits may be provided to the memory array 218 to be written into the memory cells MC.

The device 200 may use hash circuits for various applications. Accordingly, the device 200 may use hash keys (e.g., the signal Key). Rather than use static keys, the device 200 may regenerate the keys based on one or more triggers. The device 200 may include a seed generator circuit 232, which may in some embodiments be included in the seed generator circuit 110 of FIG. 1. The seed generator circuit 232 may provide a seed signal Seed. The seed generator circuit 232 may receive a seed update signal NewSeed, and responsive to the seed update signal at an active level (e.g., a high logical level) may change the value of the seed signal Seed. The seed update signal NewSeed may represent a signal generated within the memory device 200 (e.g., based on a timer) specifically to change the seeds. The seed update signal NewSeed may be generated by the command decoder 206 in response to a command received (e.g., at the CA terminals). The seed update signal NewSeed may be (or may be based on) one or more signals used within the device for various other purposes such as the power up reset signal PwrUpRst. In some embodiments, multiple triggers (e.g., a command, power up/reset, and/or timers) may be used, and each may trigger the seed update signal NewSeed to be provided at an active level.

In some embodiments, the seed value may be provided a controller and stored on the memory device 200 (e.g., in a mode register). In such embodiments, the seed update signal may include a mode register write command and a new value of the seed. Responsive to receiving a new value of the seed, the random number generator 234 may generate a new set of hash keys. In some embodiments, the seed generator circuit 232 may be omitted from the device 200, as its functions may be performed by a controller. In some embodiments, the seed generator circuit 232 may represent a circuit which retrieves the seed value from the mode register and tracks when the value changes (e.g., so that new keys may be generated).

Based on the seed signal, a random number generator (RNG) 234 may provide one or more keys Key. Each of the hash keys may be a binary number. A set of such numbers may be provided to a given hash circuit as a set of keys. In some embodiments, there may be multiple hash circuits and they may share a set of keys in common. In some embodiments, each of the different hash circuits may receive its own set of keys. In some embodiments, there may be a different RNG 234 for each hash circuit to generate a set of keys for that hash circuit. In some embodiments, the different RNGs may each receive different seed values Seed, either from the same seed generator, or from different seed generators.

One example use for hash circuits in the device 200 is to track which addresses have been identified as including errors by the ECC control circuit 220. The ECC control circuit 220 may be used to ensure the fidelity of the data read from a particular group of memory cells to the data written to that group of memory cells. The device 200 may include a number of different ECC control circuits 220, each of which is responsible for a different portion of the memory cells MC of the memory array 218. For example, there may be one or more ECC control circuits 220 for each bank of the memory array 218.

Each ECC control circuit 220 may receive a certain number of data bits (either from the IO circuit 222 or the memory array 218) and may use a number of parity bits based on the number of data bits to correct potential errors in the data bits. For example, as part of a write operation an ECC control circuit 220 may receive 128 bits of data from the IO circuit and may generate 8 parity bits based on those 128 data bits. The 128 data bits and the 8 parity bits (e.g., 136 total bits) may be written to the memory array 218. As part of an example read operation, the ECC control circuit 220 may receive 128 data bits and 8 parity bits from the memory cell array 218. The ECC control circuit 220 may use the 8 parity bits to determine if there are any errors in the 128 read data bits, and may correct them if any are found. For example, the ECC control circuit 220 may be able to locate and correct up to one error in the 128 data bits based on the 8 parity bits. While various embodiments may be discussed with reference to ECC circuits which use 8 parity bits to find one error in 128 data bits, it should be understood that these are for explanatory purposes only, and that other numbers of data bits, error bits, and parity bits may be used in other example embodiments.

The memory may include an error tracking circuit 230, which may track which memory cells (if any) are associated with relatively frequent problems. For example, the error tracking circuit 230 may track rows of the memory array 218 which have been identified as including an error bit during read operations. The ECC control circuit 220 may provide the signal ErrDet at an active level to indicate that an error bit has been detected. The error tracking circuit 230 may receive the row address XADD, responsive to the signal ErrDet at an active level. The error tracking circuit 230 may include a sketch circuit which includes one or more count values associated with the received address. Based on the value of one or more of those count values, the error tracking circuit may determine if the row is a 'problem row' Err_XADD associated with a relatively high number of errors, and if so may store the identified problem row Err_XADD in a problem storage structure (e.g., a stack of registers). In some embodiments, the identified problem rows Err_XADD may be read out of the error tracking circuit 230 (e.g., out to the data terminals DQ). In some embodiments, the identified problem rows Err_XADD may be used as part of a repair operation (e.g., a post-package repair operation). The repair operation may include redirecting the problem address Err_XADD to a redundant row of memory.

One example use for hash circuits in the device 200 is track which addresses are 'aggressors' so that the refresh control circuit 216 can refresh the victims of those aggressors as part of a targeted refresh operation. The device 200 may receive commands causing it to carry out one or more refresh operations as part of a self-refresh mode. In some embodiments, the self-refresh mode command may be externally issued to the memory device 200. In some embodiments, the self-refresh mode command may be periodically generated by a component of the device. In some embodiments, when an external signal indicates a self-refresh entry command, the refresh signal AREF may also be activated. The refresh signal AREF may be a pulse signal which is activated when the command decoder 206 receives a signal which indicates entry to the self-refresh mode. The refresh signal AREF may be activated once immediately after command input, and thereafter may be cyclically activated at desired internal timing. The refresh signal AREF may be used to control the timing of refresh operations during the self-refresh mode. Thus, refresh operations may continue automatically. A self-refresh exit command may cause the automatic activation of the refresh signal AREF to stop and return to an IDLE state. The refresh signal AREF is supplied to the refresh control circuit 216. The refresh control circuit 216 supplies a refresh row address RXADD to the row decoder 208, which may refresh one or more wordlines WL indicated by the refresh row address RXADD.

The refresh control circuit 216 may perform auto-refresh operations during the self-refresh mode such that each word line of the memory array 218 is refreshed faster than an expected rate of data decay. However, certain conditions may increase the rate of data decay above the normally expected rate. For example, repeated accesses to a given row (an aggressor row) as part of a 'row hammer attack' may increase the rate of data decay in other nearby rows (victim rows). The refresh control circuit 216 may track accesses to different row addresses using a sketch circuit. When a number and/or rate of accesses to a given row address exceeds a threshold, the refresh control circuit 216 may identify that row as an aggressor. The addresses of the identified aggressor rows may be stored.

Along with auto-refresh operations, the memory device 200 may perform targeted refresh operations during the targeted refresh mode. During a targeted refresh operation, the refresh control circuit 216 may provide refresh addresses RXADD which are based on one of the stored aggressor addresses. The refresh address RXADD may represent an address of a victim row. In some embodiments, the refresh address RXADD may represent a word line which is physically adjacent to the identified aggressor (e.g., R+/−1). In some embodiments, other relationships between the aggressor and victims (e.g., R+/−2) may be used.

The power supply terminals are supplied with power supply potentials VDD and VSS. The power supply potentials VDD and VSS are supplied to an internal voltage generator circuit 224. The internal voltage generator circuit 224 generates various internal potentials VPP, VOD, VARY, VPERI, and the like based on the power supply potentials VDD and VSS supplied to the power supply terminals. The internal potential VPP is mainly used in the row decoder 208, the internal potentials VOD and VARY are mainly used in the sense amplifiers SAMP included in the memory array 218, and the internal potential VPERI is used in many peripheral circuit blocks.

The power supply terminals are also supplied with power supply potentials VDDQ and VSSQ. The power supply potentials VDDQ and VSSQ are supplied to the input/output circuit 222. The power supply potentials VDDQ and VSSQ supplied to the power supply terminals may be the same potentials as the power supply potentials VDD and VSS supplied to the power supply terminals in an embodiment of the disclosure. The power supply potentials VDDQ and VSSQ supplied to the power supply terminals may be different potentials from the power supply potentials VDD and VSS supplied to the power supply terminals in another embodiment of the disclosure. The power supply potentials VDDQ and VSSQ supplied to the power supply terminals are used for the input/output circuit 222 so that power supply noise generated by the input/output circuit 222 does not propagate to the other circuit blocks.

FIG. 3 is a block diagram of a sketch circuit according to some embodiments of the present disclosure. The sketch circuit 300 may, in some embodiments, be included in the sketch circuit 122 of FIG. 1. In some embodiments, the sketch circuit 300 may be included in the refresh control circuit 216 of FIG. 2 and/or the error tracking circuit 230 of FIG. 2.

The sketch circuit 300 includes a number of hash circuits, 312, 322, and 332, each which hashes a received row address XADD along the row address bus. In some embodiments, all row addresses XADD along the row address bus may be received. In some embodiments, a portion of the row addresses along the row address bus may be received by the sketch circuit 300. For example a sampling signal may activate (e.g., with periodic timing, with random timing, with timing based on one or more other signals, or combinations thereof) and the sketch circuit 300 may receive the row address XADD when the sampling signal is active. In some embodiments, an identification signal (e.g., the signal ErrDet of FIG. 2) may be provided by one or more other components of the memory to indicate that the current row address should be received, and the sketch circuit 300 may receive the row address XADD when the identification signal is active.

Each hash circuit 312, 322, and 332 may change a count value stored in one of the registers of an associated data stack 310, 320, and 330, respectively based on the value of the hash generated by that respective hash circuit. The changed count values (e.g., the count values associated with the row address XADD) may be provided to a count logic circuit 302, which may use the provided count values to determine if the received row address XADD has been received at a rate above a given access number/rate threshold. Such identified rows ID_XADD may generally be referred to as a 'problem row', although whether the identified row ID_XADD represents a problem for the memory may depend on the application the sketch circuit 300 is being used for.

If the count logic 302 determines that the row address XADD is problem row, then storage logic 340 may store the row address XADD in an address storage structure 342. The addresses ID_XADD stored in the address storage data structure (or problem storage) 342 may be read off of the memory for diagnostic purposes and/or may be used to repair the row (e.g., by redirecting the row address XADD to a redundant row of memory).

The count logic circuit 302 of FIG. 3 shows a number of sub-components for each of the count locator 304, threshold comparator 306, and count adjustor 308. These sub-components are shown as dotted line boxes, and are optional components of the count logic 302. In some embodiments, the dotted line sub-components may represent system level components of the memory which are coupled to the count logic circuit 302. For example, the timer sub-component may be coupled to a clock signal of the memory (e.g., ICLK of FIG. 1). In some embodiments, the sub-components may represent optional features of the sketch circuit 300 and may be enabled/disabled by user setting (e.g., via mode register setting, via fuses, etc.).

The sketch circuit 300 includes a number of hash circuits such as 312, 322, and 332, each of which is associated with a data stack (e.g., 310, 320, and 330), respectively. Since the hash circuits and data stacks may generally be similar to each other, for the sake of brevity only the first hash circuit 312 and data stack 310 will be described in detail.

The first hash circuit 312 may be an m-bit hash circuit. Responsive to receiving a row address XADD the first hash circuit 312 may convert the row address into an m-bit hash value based on the value of the row address XADD (e.g., the state of the bits of the row address) and based on the values of a set of hash keys Key. For example, the row address XADD may be a certain number of bits (e.g., 17 bits). The first hash circuit 312 may hash row address XADD into an m-bit number. The number of bits, m, may generally be less than the number of bits in the unhashed row address XADD. Accordingly, multiple values of the row address XADD may be associated with a given value of the m-bit hash. Which row addresses are associated with the value of the hash may depend, in part, on the value of the hash keys Key used by the first hash circuit 312.

The data stack 310 may be any structure capable of storing a number of different count values. For example, the data stack 310 may include a number of registers, each of which may store a count value (e.g., as a binary number). The data stack 310 may hold a number of count values equal to number of possible values of the m-bit hash value (e.g., $2^m$ different count values). For example, if the first hash circuit 312 is an 8-bit hash circuit, then the data stack 310 may include 256 different count values. Accordingly, each count value may be associated with one of the values of the m-bit hash value.

When the hash circuit 312 receives the row address XADD, it may provide an m-bit hash value associated with a value of the row address XADD. Responsive to the m-bit hash value, the count value in the data stack 310 associated with that value of the m-bit hash value may be changed (e.g., incremented). In some embodiments, the count value $CV_0$ associated with the value of the m-bit hash (e.g., associated with the row address XADD) may be provided to a count logic circuit 302, which may change the count value $CV_0$ and then rewrite it into the data stack 310.

The different hash circuits 312, 322, and 332 may be independent of each other. Accordingly, a given row address may be hashed into a first value by the first hash circuit 312, and into a second hash value by the second hash circuit 322. The first hash value and the second hash value are not necessarily the same value (although they may be). Since the hash values act as indices for the count value, this means that each count value may be associated with a different set of row addresses. In some embodiments, the hash circuits 312, 322, and 332 may receive different key values. For example, the first hash circuit 312 may receive a first set of keys Key1, the second hash circuit 322 may receive a second set of keys Key2, and the third hash circuit 332 may receive a third set of keys Key3. The different keys may lead the different hash values to operate in different manners even if the hash circuits are physically similar to each other.

In some embodiments, the different hash circuits 312, 322, and 332 may all generate different lengths of hash. For example, the first hash circuit 312 may be an m-bit hash circuit, the second hash circuit 322 may be an n-bit hash circuit, and the third hash circuit 332 may be an o-bit hash circuit, where m, n, and o are different numbers. Accordingly, the associated data stacks 310, 320, and 330 may hold different numbers of count values. For example m may be an 8 bit hash, and the first data stack 310 may hold 256 count values, n may be 7 and the second data stack 320 may hold 128 different count values, and o may be 6 and the third data stack 330 may hold 64 different count values. Different lengths of hash may be used in other example embodiments. The use of different hashes means that each count value may be associated with different numbers of row addresses. In such embodiments, the different hash circuits may receive different lengths of key. For example, the set of keys provided to the first hash circuit 212 may include a number of keys each of which is m-bits long, and so forth.

In some embodiments, each of the different hash circuits 312, 322, and 332 may all generate the same length of output hash (e.g., m=n=o). For example, each of the hash circuits may be a 7 bit hash circuit, and each of the data stacks 310, 320, and 330 may hold 128 different count values. In such embodiments, each hash circuit may receive sets of keys which are all the same length.

Responsive to a row address XADD, each of the data stacks 310, 320, and 330 may provide a respective count value CV0, CV1, and CV2 to the count logic circuit 302. These count values may be different from each other, because each may be associated with a different set of values of the row address XADD. A count adjustor circuit 308 of the count logic 302 may update the received values, for example by incrementing them. In some embodiments, how the count adjustor 308 changes the count values CV0 to CV2 may be partially dependent on the values of the count values CV0 to CV2. For example, the count value CV1 may only be changed (e.g., incremented) if the value CV0 is above a threshold (e.g., has reached a maximum value).

In some embodiments, the count adjustor circuit 308 may periodically change the count values in a different direction (e.g., decrease them). For example, after a set period of time (e.g., a certain number of clock cycles), the count adjustor 308 may change (e.g., decrease) all of the count values stored in the data stacks 310, 320, and 330. In some embodiments, the count adjustor 308 may reduce the count values to a minimum value by resetting them (e.g., to 0).

A count locator circuit 304 may select one of the received counts, or may synthesize a new value based on the set of count values CV0 to CV2 as a comparison value. The count locator circuit 304 may use one or more statistics based on the set of count values CV0 to CV2. For example, the count locator circuit 304 may compare the count values CV0 to CV2 and take the minimum. The count locator circuit 304 may also generate a statistic based on the set of count values, and may, for example, provide the mean or median value of CV0 to CV2. In some embodiments, only one of the minimum, median, and mean may be provided. In some embodiments, a user may be able to select which statistic is used. In some embodiments, all three of the minimum, median, and mean may be calculated and output by the count locator, and may be used separately. Other statistics may be used in other example embodiments.

In some embodiments, rather than using a statistic, the count locator 304 may select one of the count values CV0 to CV2 to use as the comparison value. For example, in embodiments there each count value is changed only if a previous count value is above a threshold (e.g., CV1 is changed if CV0 is greater than a threshold), then a particular count value (e.g., CV2) may be provided by the count locator 304. In some embodiments, which count value is used may be changed periodically. For example a count value may be randomly selected.

The count locator circuit 304 may provide the comparison value to a threshold comparator circuit 306. The threshold comparator circuit 306 may compare the received comparison value to a threshold value Thresh. If the threshold comparator circuit 306 determines that the received statistic is greater than the value Thresh, then the count logic circuit 302 may provide a capture signal Capture at an active level (e.g., a high logical level, a pulse, a rising edge, etc.). In some embodiments, the threshold may be periodically changed. For example, the threshold Thresh may be randomly varied based on the output of a random number generator RNG.

A storage logic circuit 340 may receive the signal Capture. When the signal Capture is active, the storage logic circuit 340 may store the current value of the row address XADD in a row address data storage (e.g., a problem storage) 342. The problem address storage 342 may be a data structure with a number of registers, each of which may be used to store an identified problem row address XADD. In some embodiments, the addresses stored in the problem address storage 342 may be provided off the memory. For example, a controller may perform a read operation and specify the problem address storage and may retrieve the list of problem addresses. In some embodiments, these addresses may be deleted from the storage when they are read out. In some embodiments, when the addresses are read out, the count adjustor 308 may reduce the count values associated with those addresses. In some embodiments, the addresses in the problem address storage 342 may be used by an internal process of the memory, for example used as part of a targeted refresh operation. In some embodiments, when an address ID_XADD is stored in the problem storage 342, the count logic 302 may change (e.g., reduce) the count values associated with that address. In some embodiments, the amount of the reduction may be based on the threshold value, and/or the comparison value (e.g., the minimum).

In some embodiments, various features of the sketch circuit 300 may be user selectable. For example, a user may be able to set one or more modes of operation of the error tracking circuit, and/or may be able to enable or disable specific features. In some embodiments, the user may be able to select whether the minimum, the mean, or the median is used to generate the comparison value. Similarly, the threshold used by the threshold comparator 306 may be user selectable. In some embodiments, the user may be able to select an operational mode, for example by choosing whether each count value associated with a row address is updated (e.g., incremented) or whether the counts are updated in a 'cascade' fashion, with a count value from the first stack (e.g., 310) needing to reach a threshold value before a count value in a next stack (e.g., 320) is updated.

In some embodiments, when the hash keys are regenerated responsive to a seed update signal (e.g., NewSeed) the count values stored in the data stacks 310, 320, and 330 may no longer be useful, since the new hash keys may remap which row addresses are associated with which count values in that stack. Accordingly, in some embodiments, the count logic 302 may reset the count values in the data stacks 310, 320, and 330 when the hash keys change (e.g., responsive to an activation of the signal NewSeed).

Figure 4:
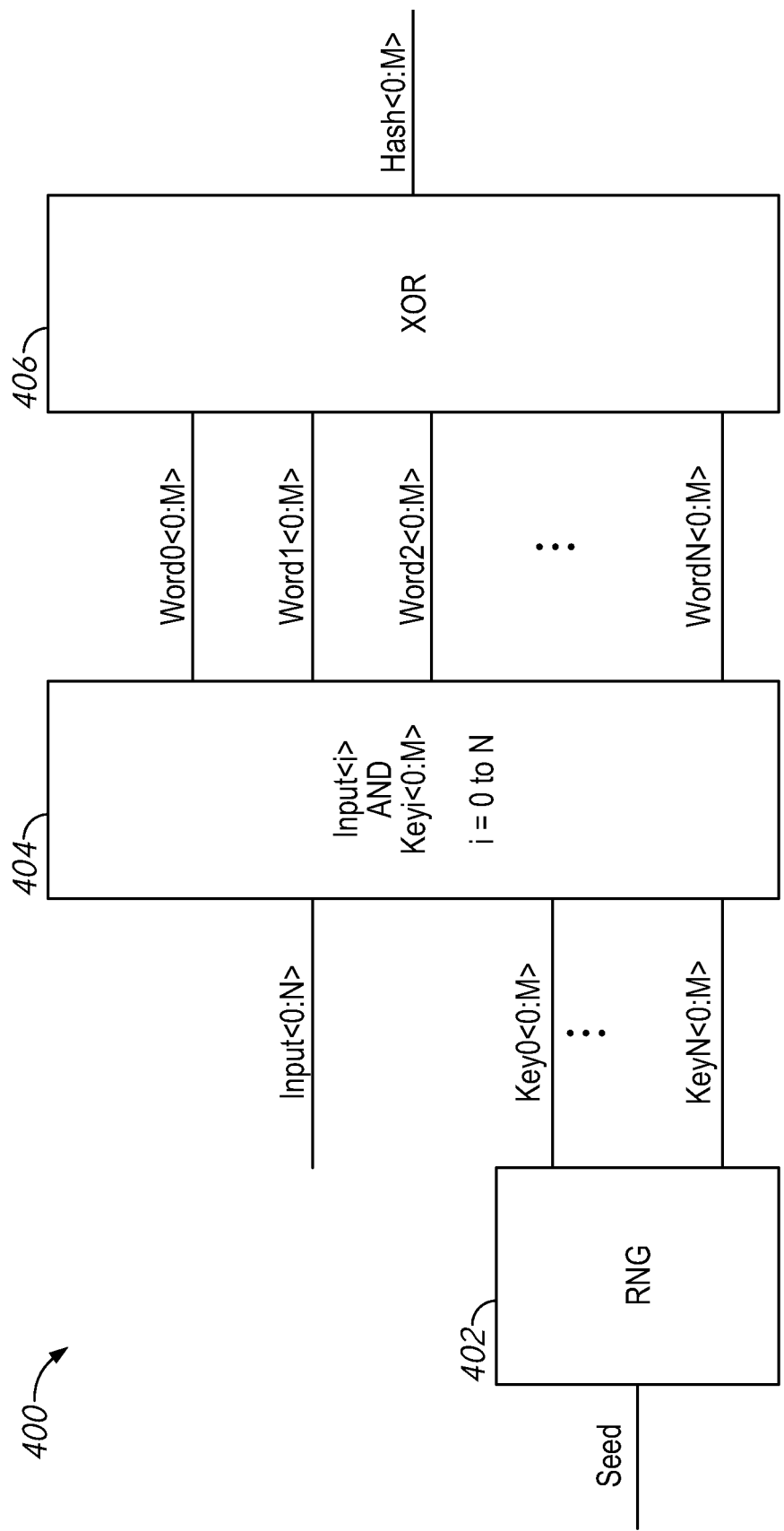
FIG. 4 is a block diagram of a hash circuit according to some embodiments of the present disclosure.

FIG. 4 is a block diagram of a hash circuit according to some embodiments of the present disclosure. The hash circuit 400 may, in some embodiments, be used as the hash circuit 120, and/or one or more of the hash circuits 212, 222, and 232 of FIG. 2. The hash circuit 400 of FIG. 4 represents a simplified view of the operation of a hash circuit, in order to explain the general operation of a hash circuit. Hash circuits of the present disclosure may use more complicated logic and/or other processes to convert the input signal into the hash.

The hash circuit 400 of FIG. 4 is shown as including the random number generator (RNG) 402, which may, in some embodiments, act as the RNG 121 of FIG. 1 and/or 234 of FIG. 2. In the embodiment of FIG. 4, the RNG 402 may be included in the hash circuit 400, and the hash circuit may directly receive the seed value Seed in order to generate a set of keys.

The hash circuit 400 may receive an input value Input, which may be an N+1 bit number (e.g., Input<0:N>). In some embodiments, the value Input may be a row address. The hash circuit 400 may generate an output value Hash, which may be an M+1 bit number (e.g., Hash<0:M>). The value M may generally be a smaller number than the value N.

The RNG 402 generates a set of keys which is based on the values N and M. Specifically, the RNG 402 generates N+1 keys, each of which is of length M+1. Block 404 may combine each key from the set of keys with a bit of the input value. For example, each bit of the input value (e.g., Input<i>) may be combined with a corresponding one of the keys Ki<0:M> to generate a Word. So a first bit may be combined with a first key, and so forth. In the example of FIG. 4, AND logic may be used to combine each bit of the input with the associated key. Each word may be an M+1 bit length and after combining each bit of the Input with the associated key, there may be a set of N+1 words.

Block 406 may combine the words together to generate the output Hash. In the example of FIG. 4, XOR logic may be used to combine all of the Words together, Once the words have been combined, the output may be an output value Hash which is M+1 bits in length.

Figure 5:
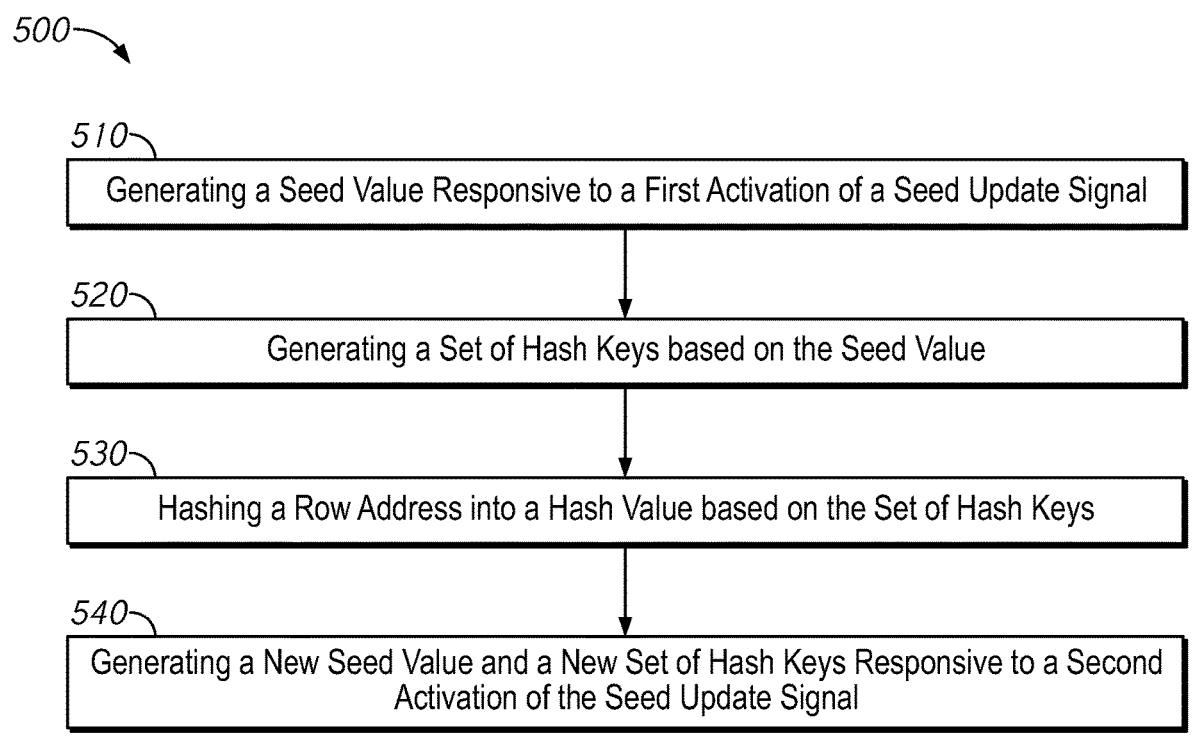
FIG. 5 is a block diagram of a method of changing hash keys in a memory according to some embodiments of the present disclosure.

FIG. 5 is a block diagram of a method of changing hash keys in a memory according to some embodiments of the present disclosure. The method 500 may, in some embodiments, be implemented by one or more of the components described in FIGS. 1-4.

The method 500 may begin with block 510, which describes generating a seed value responsive to a first activation of a seed update signal. The seed update signal may be activated responsive to a command received from a controller, a power up or reset operation, or some internal logic of the memory (e.g., a timer). A seed source may provide a value of the seed. In some embodiments, the seed may be based on one or more signals or physical properties of the memory (e.g., the seed may be all or part of a latched row address). In some embodiments, the seed value may be provided by a controller of the memory, and the seed update signal may include receiving a new value of seed from the controller. For example, the seed may be stored in a mode register of the memory, and the controller may write a new value of seed to the mode register.

Block 510 may generally be followed by block 520, which describes generating a set of hash keys based on the seed value. The set of hash keys may be a collection of binary numbers. In some embodiments, the set of hash keys may be generated by a random number generator based on the seed value. The set of hash keys may be generated all at once and stored, or may be generated as each key is needed.

Block 520 may generally be followed by block 530, which describes hashing a row address into a hash value based on the set of hash keys. The row address may be associated with a word line in a memory array (e.g., 218 of FIG. 2). The row address may have a first number of bits, and the hash value may have a second number of bits different than the first number of bits. The second number of bits may be less than the first number of bits. The number of keys in the set of keys, and the length of the individual keys in the set of keys may be based on the first and the second number of bits, respectively.

Block 530 may generally be followed by block 540, which describes generating a new seed value and a new set of hash keys responsive to a second activation of the seed update signal. In some embodiments, a first and a second seed value may be generated responsive to the first activation of the seed update signal. The second seed value may be stored (e.g., in a latch such as 116 of FIG. 1). Switch logic may switch to providing the second seed value responsive to the second activation of the seed update signal.

In some embodiments, a count value stored in a sketch circuit may be updated (e.g., incremented) based on the hash value. For example the hash value may act as an index for a set of count values. In some embodiments, the count value may be reset based on the second activation of the seed update signal.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. An apparatus comprising:
   a seed generator configured to update a seed value responsive to a seed update signal;
   a hash generator configured to generate a hash value based on the seed value and a row address; and
   a sketch circuit configured to change a count value associated with the hash value.

2. The apparatus of claim 1, wherein the seed update signal is based on a command issued by a controller to a memory, a timing signal, a power up signal, a reset signal, or combinations thereof.

3. The apparatus of claim 1, further comprising a random number generator (RNG) configured to generate a set of keys based on seed value, wherein the hash generator is configured to generate the hash value based on the set of keys.

4. The apparatus of claim 3, wherein the row address is an N-bit value, the hash value is an M-bit number, and the RNG is configured to generate N M-bit numbers as the set of keys.

5. The apparatus of claim 1, wherein the sketch circuit is configured to determine if the row address is an aggressor address.

6. The apparatus of claim 5, further comprising a refresh control circuit configured to refresh at least one word line of a memory array based on the row address if the row address is an aggressor address.

7. The apparatus of claim 1, further comprising an error correction code (ECC) circuit configured to provide an error detected signal at an active level if an error is detected in data read from a word line associated with the row address, wherein the hash generator is configured to generate the hash value when the signal is at the active level.

8. The apparatus of claim 1, wherein the seed generator comprises:
   a seed source configured to generate binary numbers;
   a first latch configured to store a first value of the binary numbers;
   a second latch configured to store a second value of the binary numbers; and
   switch logic configured to provide the first value of the binary numbers as the seed value, and configured to switch to providing the second value of the binary numbers as the seed value responsive to the seed update signal.

9. An apparatus comprising:
   a memory array comprising a plurality of word lines, each associated with a value of a row address;
   a random number generator configured to generate a set of hash keys, wherein the set of hash keys is changed responsive to a seed update signal;
   a hash circuit configured to generate a hash value based on a value of the row address and the set of hash keys; and
   a sketch circuit configured to change a count value based on the hash value.

10. The apparatus of claim 9, further comprising a seed generator circuit configured to provide a seed value and configured to change the seed value responsive to the seed update signal, wherein the random number generator is configured to generate the set of hash keys based on the seed value.

11. The apparatus of claim 9, wherein the seed update signal is provided responsive to a command issued by a controller to the memory array, a timing signal, a power up signal, a reset signal, or combinations thereof.

12. The apparatus of claim 9, further comprising storage logic configured to store the row address in an address storage structure based on the count value.

13. The apparatus of claim 9, further comprising:
   a second hash circuit configured to generate a second hash value based on the row address and the set of hash keys, wherein the sketch circuit is configured to change a second count value based on the second hash value.

14. The apparatus of claim 9, further comprising:
a second hash circuit configured to generate a second hash value based on the row address and a second set of hash keys, wherein the sketch circuit is configured to change a second count value based on the second hash value.

15. The apparatus of claim 9, further comprising a mode register configured to store a seed value, wherein the random number generator is configured to generate the set of hash keys based on the seed value, and wherein the seed update signal comprises a mode register write operation to write a new value of the seed value to the mode register.

16. The apparatus of claim 15, wherein the mode register write operation and the new value of the seed value are received from a controller.

17. A method comprising:
generating a seed value responsive to a first activation of a seed update signal;
generating a set of hash keys based on the seed value;
hashing a row address into a hash value based on the set of hash keys, wherein the row address is associated with a word line of a memory array; and
generating a new seed value and a new set of hash keys responsive to a second activation of the seed update signal.

18. The method of claim 17, further comprising activating the seed update signal responsive to a power up of a memory, a reset of the memory, a command received by the memory, an amount of time passing, or combinations thereof, wherein the memory includes the memory array.

19. The method of claim 17, further comprising changing a count value based on the hash value.

20. The method of claim 19, further comprising resetting the count value responsive to generating the new set of hash keys.

21. The method of claim 17, further comprising:
generating a second seed value responsive to the first activation of the seed update signal;
storing the second seed value; and
providing the second seed value as the new seed value responsive to the second activation of the seed update signal.

22. The method of claim 17, further comprising:
generating a second set of hash keys responsive to the first activation of the seed update signal;
hashing the row address into a second hash value based on the second set of hash keys; and
generating a new second set of hash keys responsive to the second activation of the seed update signal.

\* \* \* \* \*